R. HAYDEN.
Hitching-Hooks.

No. 217,942. Patented July 29, 1879.

Witnesses
Wendell R. Curtis
Wilmot Horton

Inventor
Randolph Hayden
by Thos. G. Ellis, Attorney

UNITED STATES PATENT OFFICE.

RANDOLPH HAYDEN, OF MIDDLETOWN, CONNECTICUT.

IMPROVEMENT IN HITCHING-HOOKS.

Specification forming part of Letters Patent No. 217,942, dated July 29, 1879; application filed June 7, 1879.

*To all whom it may concern:*

Be it known that I, RANDOLPH HAYDEN, of Middletown, in the county of Middlesex and State of Connecticut, have invented certain new and useful Improvements in Hitching-Hooks; and I do hereby declare that the following is a full, clear, and exact description thereof, whereby a person skilled in the art can make and use the same, reference being had to the accompanying drawings, and to the letters of reference marked thereon.

Like letters in the figures indicate the same parts.

My invention relates to such hooks as are intended to be used upon hitching-straps for horses, reins, and other parts of harnesses, and for other similar purposes for which the ordinary snap-hooks now in use are adapted.

The object of my invention is to provide a better and more secure hook than the snap-hooks now ordinarily used, and to avoid the use of a spring or tongue, upon which the security of the hooks now in common use wholly depends.

My invention consists in the construction and arrangement of the several parts and their combination to form a hook, as will be hereinafter described.

Figure 1:
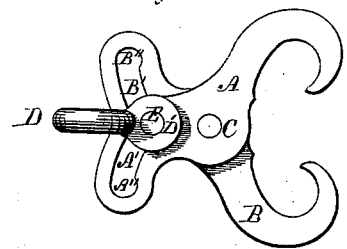
Figure 2:
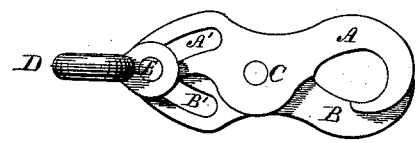
Figure 3:
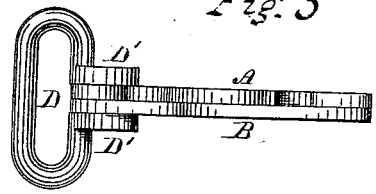

In the accompanying drawings, Figure 1 shows a side view of my improved hook open. Fig. 2 shows a side view of the same closed. Fig. 3 shows an edge view of my improved hook.

A and B are two leaves or blades of similar form, which are hinged or pivoted together by the screw or rivet C. At the hook end they lap by each other when closed, as shown in Fig. 2, the interior curves of the two parts coinciding when closed, so as to form parts of the same loop.

The rear ends of the parts A and B are furnished with the slots A' and B', arranged in such a position with relation to each other that when the hook is open the inner ends of the slots are together, and when the hook is closed the outer ends are together.

D is the loop for attaching a strap to the hook. It has the two ears D', which embrace the sides of the parts A and B and hold the ends of the pin E, which passes through the slots A' and B' and slides freely in them. When the hook is open, as shown in Fig. 1, this pin slides to the inner ends of the slots, and when the hook is closed, as shown in Fig. 2, the pin slides to the outer ends of the slots.

It will thus be seen that any tension upon the strap firmly closes the two parts of the hook together, and that they cannot open unless the tension is relaxed.

A'' and B'' are lateral recesses at the outer ends of the slots, into which the pin E enters when the hook is closed. This is for the purpose of preventing the hook from being opened by any accidental back-pressure from the loop or strap. The return points of the hooks on the parts A and B also serve the purpose of preventing any accidental opening.

When it is desired to release the hook it can be readily opened by removing the tension upon the strap and separating the points by hand.

What I claim as my invention is—

1. The combination of the hooked leaves A and B, pivoted at C, and having the slots A' and B', with the loop D and pin E, substantially as described.

2. The combination of the parts A and B, constructed as described, and furnished with the locking-recesses A'' and B'', in combination with the loop D and pin E, substantially as set forth.

3. A hitching-hook composed of two leaves, the hooked ends of which are closed and held together by means of a pin drawn backward through slots in their rear ends, substantially as described.

RANDOLPH HAYDEN.

Witnesses:
 THEO. G. ELLIS,
 WENDELL R. CURTIS.